2 Sheets—Sheet 1.

S. A. LITTLE.

TIME-LOCK.

No. 7,104. Reissued May 9, 1876.

WITNESSES

Wm. A. Skinkle

F. Stich

By his Attorney.

INVENTOR

Samuel A. Little

Marcus S. Hopkins

2 Sheets—Sheet 2.

S. A. LITTLE.

TIME-LOCK.

No. 7,104. Reissued May 9, 1876.

WITNESSES

Wm A. Skinkle

F. Stid

By his Attorney

INVENTOR

Samuel A Little

Marcus S. Hopkins

7,104. TIME-LOCKS. Samuel A. Little, Buckland, Mass., assignor to the Yale Lock Manufacturing Company, Stamford, Conn. Patent No. 146,832, dated Jan. 27, 1874. [Filed Mar. 15, 1876.]

*To all whom it may concern:*

Be it known that I, SAMUEL A. LITTLE, of Buckland, in the county of Franklin and State of Massachusetts, have invented certain new and useful Improvements in Chronometric Locks, of which the following is a specification, that will enable those skilled in the art to which they appertain to make and use them, reference being had to the accompanying drawings.

The object of my invention is to construct a time-lock, and to combine it with the multiple sliding bolt-work of a safe or vault door, so that, by the continuous movement of its time mechanism, locking and unlocking will be periodically effected; and to provide said lock with adjustable devices for regulating and controlling the hours of both locking and unlocking; and to combine with said daily unlocking devices a device for preventing the unlocking of the lock every seventh day for a period greater than twenty-four hours.

Figure 1:
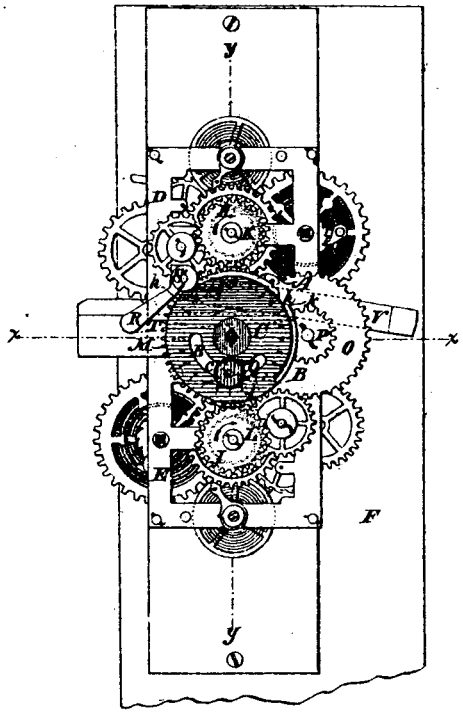
Figure 2:
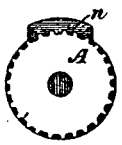
Figure 3:
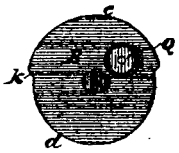
Figure 5:
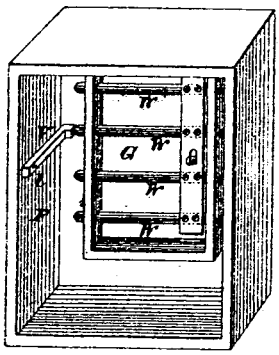
Figure 7:
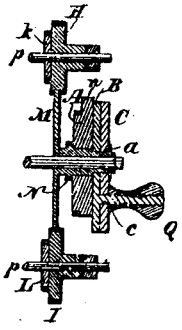
Figure 6:
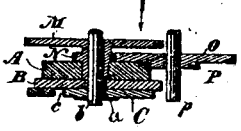
Figure 4:
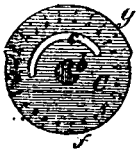

Figure 1 is a front view of my improved clock-lock attached to the inside of a safe, adjacent to the hinge part of the safe-door. Fig. 2 shows a seventh-day wheel, marked A in Fig. 1. Fig. 3 shows a cam-wheel, marked B in Fig. 1. Fig. 4 shows a graduated cam-wheel, marked C in Fig. 1. Fig. 5 represents the inside of a safe with the door-bolts locked forward by the lever-dog, which is elevated by the clock-lock. Fig. 6 represents a horizontal section of my clock-lock detached from the clocks, the dog-lever excepted, taken through the line *x x* of Fig. 1. Fig. 7 represents a vertical section of the same, (similarly detached, except that the clock-wheels to which the same is immediately attached are shown,) taken through the line *y y* of Fig. 1.

In the various figures, similar letters indicate similar parts.

D and E are two clock-movements fastened to the inside F of a safe, adjacent to the hinged part of a safe-door, G. Said clock-movements, through the wheels and ratchets K and L, (shown by the dotted lines, Fig. 1,) which are rotated once in twelve hours by the clocks, propel the wheels H and I in the same time in the direction of the arrows thereon. The wheels H and I are both geared to the common wheel M, having twice as many teeth as either H or I, and propel the same in the direction of the arrow thereon, so that, while H and I are rotated once in twelve hours, M is rotated once a day. It will be seen that both clocks work together in turning the wheel M, and thereby operate the lock, while, if either clock stops, the wheel, H or I, of the other will alone continue to rotate the wheel M and operate the lock, as the ratchet allows free motion to the wheel, I or H, of the other clock, although said clock may be stopped. Forming part of the wheel M is the toothed wheel N, which is geared into and drives the toothed wheel O. Forming part of the wheel O is the toothed wheel P, which is geared into and drives the seventh-day wheel A. A has twice as many teeth as P, and O has three and a half times as many teeth as N. Therefore, while M revolves once in a day, it propels A to revolve once in seven days. The wheel C, which is graduated for the hours of the day, is fastened upon the hub *a* of the wheel M by the projection *b*, and rotates with the same. On the same hub is the wheel B, which is fastened by friction to C in different positions by the thumb-screw Q, which forms part of the wheel B, and passes through the slot *c* of the wheel C. *p p p p p* are pivots on which the several wheels revolve. The wheel B is cut away on the outer edge, leaving the depression *d* and the cam projection *e* thereon, and the edge of C is similarly cut away, leaving the depression *f* and the cam projection *g* thereon. When the two wheels B and C are fastened together by the thumb screw Q, side by side, they form one wheel, and have a common depression, *h*, which may be enlarged or diminished by rotating the wheel B on the wheel A with the thumb-screw, and setting the same and a common cam or projection, *i*, which may be enlarged or diminished in the same manner. Pivoted near the lock is the two-armed lever R, whereof one arm carries the roller S, and is lifted through the same by the cam *i* revolving under the same at said cam's inclined plane *k*, and, at the same time, the other arm T of said lever lifts the dog-lever V, as shown by the dotted lines, Fig. 1, up behind the door-bolts W W W W, into the position shown in Fig. 5, thereby locking said bolts forward behind the jamb of the safe, so that the door cannot be opened. Said dog-lever V is pivoted at *l*. On the other hand, when the cam *i* is rotated entirely from under the roller S, said roller is suffered to drop by gravity into the depression *h* at the inclined plane *m*, which allows the dog-lever V to fall from behind the safe-bolts and the safe to be opened.

The seventh-day wheel A has on its edge a cam projection, *n*, which rotates once while the depression *h* rotates seven times, as described, and is so arranged relatively to the said depression *h* that, on every seventh revolution thereof, it is brought under the roller S and holds up the lever R, while the depression *h* passes under it, so that every seventh day the same prevents the safe from being unlocked.

From the description aforesaid, the mode of operation will be obvious. The clocks are set to true time by bringing the hour-mark on the dial C under the roller S, which is readily done by turning the dial, as the wheels A, B, C, and M are freely turned in the direction of the arrow on C, inasmuch as the ratchets behind H and I do not interfere with motion in that direction, but take up and, through the clock's force, proceed with whatever advance of said wheels may be made. The lock is then set to lock up at any given hour by loosening the thumb-screw Q, and turning the inclined plane *k* of the wheel B to the mark of the required hour, and then fastening the wheels B and C together by setting the thumb-screw Q.

If it is desired to have the lock opened any amount of time earlier than the set time, (nine o'clock,) the wheel C must be turned, as described, until the time indicated under the roller shall be that amount fast of true time, the closing-mark being altered, if desired, to suit the case. If it is desired to open later, the clocks must be stopped until they are slow of time as much as it is desired the lock shall open later than the set time, correcting the closing-mark, if desired.

If the wheels A, B, C, and M are turned as described until the cam part *n* of the wheel A shall be in position to come under the roller S, and keep the lock from opening on Sunday, it will continue to do so on Sunday each week, if the clocks run on unchanged. Thus the necessity for setting the mechanism on each Saturday so that it shall keep the safe locked over Sunday is obviated, which is a great convenience to bankers, and is, furthermore, a security against neglect to set the mechanism, which might sometimes occur. In case it shall be desired that the lock shall not open for a holiday or other day, the said wheels may be rotated until said cam part *n* is in position to come under and hold up the lever R on said day.

The lock is affixed to the side F of the safe, as described, to avoid derangement or stoppage of the clocks by concussion on the door; but it is obvious that it may be affixed to the door without modifying its construction, if desired, such being merely a change in use.

It is evident that the dog-lever V and the lever R may be the same piece. The object in making the same in two parts is to save the weight of the part V, which depends upon the pivot *l*, from adding to the labor of the clocks.

What I claim as my invention is—

1. The combination, substantially as before set forth, of the adjustable mechanism for continuously locking and unlocking daily the clock-work, and a device for preventing unlocking during a period greater than twenty-four hours.

2. In a chronometric locking mechanism, the combination, substantially as before set forth, of the clock-work and an adjustable device for determining the time of locking.

3. In a chronometric locking mechanism, the combination, substantially as before set forth, of the clock-work and two adjustable devices for determining, respectively, the times of locking and unlocking.

4. The combination, with one or more clock-movements, of one or more wheels, H I, one or more ratchets, K L, and a common wheel, M, arranged as described, for the purposes set forth.

5. The wheels B and C, with the depressions *d* and *f* and the projections *e* and *g*, located relatively to each other as described, to increase and diminish the surface of a common cam, *i*, or depression *h*, by rotation on each other, for the purposes described.

6. The wheel A, with a cam, *n*, adjusted as described, to prevent the falling of the lever R and dog V either periodically or at required times, as described.

7. The combination, substantially as before set forth, by means of suitable connecting mechanism, of the following elements, adapted, as combined, to secure the door of a safe or vault, and to automatically release the same at a predetermined time, viz: first, the multiple sliding bolt-work; second, the oscillating stop or dog, adapted to prevent the retraction of the bolt-work, and to be turned on its pivot to release the bolt-work at a time determined by the clock-work; third, the vibrating lever for holding the stop or dog in position to prevent the retraction of the bolt-work; and, fourth, the clock-work for determining the time when said lever shall be moved to permit the stop or dog to release the bolt-work.

8. In a chronometric locking mechanism, the combination, substantially as before set forth, of the following elements, adapted, as combined, to guard or dog the bolt-work of a safe or vault door, and to automatically release the same at a predetermined time, viz: first, the oscillating stop or dog, adapted to prevent the retraction of the bolt-work, and to be turned on its pivot to release the bolt-work at a time determined by the clock-work; second, the vibrating lever for holding the dog in position to prevent the retraction of the bolt-work; third, the clock-work for determining the time when said lever shall be moved to permit the dog to fall to release the bolt-work; and, fourth, the graduated wheel or dial, rotated by the clock-work, and adapted to operate said lever, and to be set for varying and controlling the time when said lever shall be moved to permit the dog to release the bolt-work.

SAMUEL A. LITTLE.

Witnesses:

N. F. BUZZEL,

H. S. CANILLARD.